Nov. 3, 1931.    C. SCHAAF ET AL    1,830,410
METHOD FOR BRANDING SAUSAGE
Filed May 6, 1929
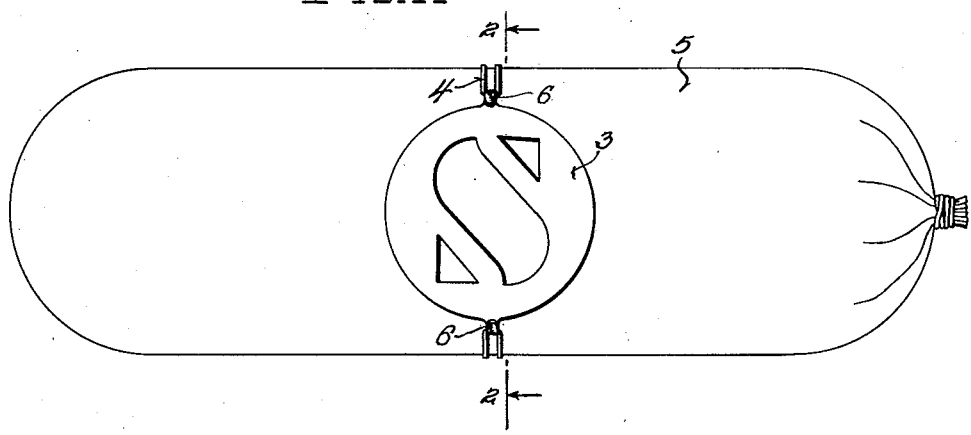
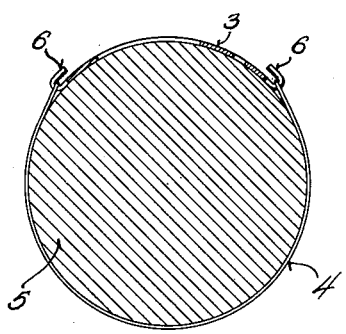
Inventor
Charles Schaaf
Forbes E. Morrison
Andrew L. Henkel
Ralph E. Williams
By Peter C. McNulty   Attorney Patented Nov. 3, 1931

1,830,410

UNITED STATES PATENT OFFICE

CHARLES SCHAAF, FORBES M. MORRISON, AND ANDREW L. HENKEL, OF MILWAUKEE, AND RALPH E. WILLIAMS, OF WAUWATOSA, WISCONSIN, ASSIGNORS TO FRANK SCHAAF COMPANY, OF MILWAUKEE, WISCONSIN, A CORPORATION OF WISCONSIN

METHOD FOR BRANDING SAUSAGE

Application filed May 6, 1929. Serial No. 360,748.

This invention relates to a process and apparatus for branding sausage to distinguish one manufacturer's product from another.

The object of the invention is to provide a process and apparatus for branding the manufacturer's mark on a sausage casing during the customary process of smoking or curing the sausage.

The invention further consists in the several features hereinafter set forth and more particularly defined by claims at the conclusion hereof.

In the drawings Fig. 1 is a detail elevation view of apparatus for carrying out the method. Fig. 2 is a detail sectional view taken on the line 2—2 of Fig. 1.

Heretofore it has sometimes been the practice to attach to the sausage some form of identification mark in order to give to the purchaser the manufacturer's identity and thus enable the purchaser to know he is buying a certain advertised brand of sausage. Until we developed our improved process this marking consisted in fastening a piece of colored string to the sausage, labeling it with gummed stickers or branding it with a hot iron. It was found that the attaching of tags or gummed stickers after the sausage was finished was not only an expensive method of identifying the manufacturer's product, but one in which the mark of identification was liable to be removed during handling of the product and the manufacturer's identity lost.

By branding the sausage with a hot iron the manufacturer's identity was not apt to be lost during handling but the branding required a separate operation in the manufacturing process which added greatly to the manufacturing cost. Also, there was danger of damaging the casing during the branding operation.

Our method consists in producing a brand stamp in the sausage casing in contrast to the remainder of the casing by shielding a portion of the casing during cooking and curing the sausages.

In carrying out our method we experimented by holding paper stencils, or stencils cut from adhesive tape, or stencils cut from pieces of sheet metal to the casing by means of string, a gauze band and also by means of an elastic tape but were unable to obtain results which we considered commercially acceptable. We finally adopted a metal stencil 3 to which a comparatively small, endless rubber band 4 could be readily attached and we found that by fastening this to the uncured sausage 5, and placing the same in the smoke house we were able to obtain a curing or coloring of the casing on all surfaces except directly under the metal stencil. We also found that the elastic properties of the rubber band prevented a marking of the casing or a ridging of the finished product. As the sausage expanded or contracted during the curing operation the stencil was always held tightly to the casing by the rubber band. This had the effect of preventing any of the smoke from getting under the stencil, thus leaving a marked contrast between the color of the cured casing and the color of the casing under the metal stencil. We also found that by leaving two small ears or hooks 6, on the metal stencil to which the rubber band 4 could be attached, that the bands and stencils could be used again and again, thus giving us a new product having the following advantages:

1. The brand is sharp and clean cut because the stencil does not lose its shape.
2. No mark other than the brand appears on the casing.
3. Because the stencil and rubber band may be readily attached or detached the operation is remarkably cheap and both the bands and stencil can be used over and over again.
4. The rubber band binds the stencil tightly to the casing at a time when a loose fit between the casing and the stencil would deteriorate the quality of the brand.
5. The rubber band keeps the stencil tight to the casing when the sausage shrinks and does not leave an indentation when the product expands.

The stencil 3 is preferably of metal but it may be of any suitable other material or composition of materials whose shape will not be affected by moisture and heat during curing process.

We desire it to be understood that this invention is not to be limited to any specific form or arrangement of parts except in so far as such limitations are included in the claims.

What we claim as our invention is:

1. A process for marking a sausage casing during the cooking and/or smoking of sausage meat inclosed in an expansible casing which consists in elastically binding a shielding means to a portion of said casing, and submitting said sausage casing and elastically bound shielding means while in contact with one another to the action of smoke and/or the action of cooking liquors.

2. A new product consisting of a sausage having a naturally distended casing selected portions of which are partially smoked and/or cooked, said selected portions constituting a smooth distinguishing mark in color contrast only.

In testimony whereof, we affix our signatures.

CHARLES SCHAAF.
FORBES M. MORRISON.
ANDREW L. HENKEL.
RALPH E. WILLIAMS.